(12) United States Patent
Sun et al.

(10) Patent No.: US 10,867,248 B1
(45) Date of Patent: Dec. 15, 2020

(54) METHOD AND EQUIPMENT FOR SEARCHING NON-UNIQUE SOLUTION OF PETROPHYSICAL PROPERTY COMBINATION IN HISTORY MATCHING

(71) Applicants: Qian Sun, Qingdao (CN); Miao Zhang, Wuhan (CN)

(72) Inventors: Qian Sun, Qingdao (CN); Miao Zhang, Wuhan (CN)

(73) Assignees: China University of Geosciences (Beijing), Beijing (CN); China University of Petroleum (Beijing), Beijing (CN)

( * ) Notice: Subject to any disclaimer, the term of this patent is extended or adjusted under 35 U.S.C. 154(b) by 0 days.

(21) Appl. No.: 16/834,303

(22) Filed: Mar. 30, 2020

(30) Foreign Application Priority Data

Jan. 16, 2020 (CN) .......................... 2020 1 0047180

(51) Int. Cl.
*G06N 5/00* (2006.01)
*G06F 30/27* (2020.01)
(Continued)

(52) U.S. Cl.
CPC ............ *G06N 5/003* (2013.01); *E21B 41/00* (2013.01); *E21B 49/00* (2013.01); *G06F 30/27* (2020.01);
(Continued)

(58) Field of Classification Search
None
See application file for complete search history.

(56) References Cited

U.S. PATENT DOCUMENTS

2016/0312607 A1\* 10/2016 McNealy ............ E21B 41/0092
2019/0087939 A1\* 3/2019 Hakimuddin ............ G06K 9/46
(Continued)

OTHER PUBLICATIONS

Coello, C. et al. "Handling Multiple Objectives With Particle Swarm Optimization" (2004) IEEE Transactions on Evolutionary Computation 8(3): 256-279.
(Continued)

*Primary Examiner* — Stanley K. Hill
(74) *Attorney, Agent, or Firm* — Volpe Koenig

(57) ABSTRACT

The present disclosure provides a method and equipment for searching a non-unique solution of a petrophysical property combination in history matching. The method includes: receiving field historical data, and dividing the field historical data into a tuning historical data portion, and a validation historical data portion; inputting initial data for the petrophysical property combination into an proxy model to obtain field response data; optimizing the petrophysical property combination to minimize an error between the field response data corresponding to the optimized petrophysical property combination and the field response data of the tuning historical data portion; inputting the optimized petrophysical property combination into the proxy model to obtain field response data corresponding to the optimized petrophysical property combination; matching the field response data corresponding to the optimized petrophysical property combination and the field response data of the validation historical data portion; and if the field response data corresponding to the optimized petrophysical property combination and the field response data of the validation historical data portion match each other, determining the optimized petrophysical property combination as the non-unique solution of the petrophysical property combination.

14 Claims, 6 Drawing Sheets

(51) Int. Cl.
*G06N 20/00* (2019.01)
*E21B 49/00* (2006.01)
*E21B 41/00* (2006.01)
*G06N 5/02* (2006.01)
*G06F 111/10* (2020.01)

(52) U.S. Cl.
CPC .............. *G06N 5/02* (2013.01); *G06N 20/00* (2019.01); *E21B 2200/20* (2020.05); *G06F 2111/10* (2020.01)

(56) References Cited

U.S. PATENT DOCUMENTS

2020/0183046 A1* 6/2020 Wheelock .............. G06N 20/10
2020/0183047 A1* 6/2020 Denli .................... G01V 1/303

OTHER PUBLICATIONS

Esmaili, S. and Mohahghegh, S.D. "Full Field Reservoir Modeling of Shale Assets Using Advanced Data-driven Analytics" (2016) Geoscience Frontiers 7: 11-20).

Min, B. et al. "Pareto-based Multi-objective History Matching with Respect to Individual Production Performance in a Heterogeneous Reservoir" (2014) J. Petroleum Science and Engineering 122: 551-566.

Negash, B.M. et al. "History Matching of the PUNQ-S3 Reservoir Model Using Proxy Modeling and Multi-objective Optimizations" (2016) Proc. Intl. Conf. Industrial Engineering and Operations Management: 1374-1386.

Ramgulam, A. "Utilization of Artificial Neural Networks in the Optimization of History Matching" (2006) M.S. thesis, The Pennsylvania State University.

Rana, S. et al. "An Efficient Assisted History Matching and Uncertainty Quantification Workflow Using Gaussian Processes Proxy Models and Variogram Based Sensitivity Analysis: GP-VARS" (2018) Computers and Geosciences 114: 73-83.

* cited by examiner

METHOD AND EQUIPMENT FOR SEARCHING NON-UNIQUE SOLUTION OF PETROPHYSICAL PROPERTY COMBINATION IN HISTORY MATCHING

CROSS-REFERENCE TO RELATED APPLICATIONS

The present application claims benefit from CN Patent Application Serial No. 202010047180.4, entitled "METHOD AND EQUIPMENT FOR SEARCHING NON-UNIQUE SOLUTION OF PETROPHYSICAL PROPERTY COMBINATION IN HISTORY MATCHING" filed Jan. 16, 2020, the entirety of which is incorporated herein by reference.

FIELD OF THE DISCLOSURE

The present disclosure relates to the technical field of oil exploration and more particularly relates to a method and equipment for searching a non-unique solution of a petrophysical property combination in history matching.

BACKGROUND OF THE DISCLOSURE

The production or pressure history matching is one of the most critical reservoir engineering and hydrological processes to establish reliable numerical simulation models to study fluid flow in porous hydrocarbon and brine formations. The historical matching studies use the field observation data (e.g., fluid flow rate and pressure measurements) from operating wells as input to determine the petrophysical parameters to accurately characterize the underground geological environments. Typically, a mathematical model that could mimic the hydrodynamic behavior of underground fluid transportation needs to be employed to compute the field response data that is consistent with field historical data. A historical matching study is a trial and error effort. One needs to examine a large volume of petrophysical property distributions and compare the model predictions with the field historical data until a satisfactory match is achieved. Therefore, one of the most challenging aspects of history-matching technology is how to reduce the computational overheads of the procedure. Totally relying on the high-fidelity numerical model could require prohibitive intensive computational loads. Recent research efforts have successfully coupled machine-learning-based algorithms in the history matching workflow (such as: Rana, S., Ertekin, T., & King, G. R. (2018). An Efficient Probabilistic Assisted History Matching Tool Using Gaussian Processes Proxy Models: Application to Coalbed Methane Reservoir. *Proceedings of SPE Annual Technical Conference and Exhibition*. Dallas, Tex., USA: SPE. doi:10.2118/191655-MS; Esmaili, S., & Shahab, D. (2016). Full field reservoir modeling of shale assets using advanced data-driven analytics. *Geoscience Frontiers,* 7(1), 11-20; and Ramgulam, A. (2006). *Utilization of Artificial Neural Networks in The Optimization of History Matching.* University Park, Pa., USA: Penn State University.).

Moreover, history matching is an inverse solution process exhibiting strong non-uniqueness solution characteristics. In other words, there exists more than one combination of petrophysical properties that could make numerical model prediction match with the field historical data. Thus, how to identify the non-unique solutions of the model is a problem. The current developments employ the Pareto front solution to establish a solution repository to collect various history-matching models (such as: Negas, B. M., Awang, M., Jufar, S. R., & Robert, A. J. (2016). History matching of the PUNQ-S3 reservoir model using proxy modeling and multi-objective optimizations. *Proceedings of the 2016 International Conference on Industrial Engineering and Operations Management*. Kuala Lumpur, Malaysia: IEOM Society International; and Min, B., Kang, J. M., Chung, S., Park, C., & Jang, I. (2014). Pareto-based multi-objective history matching with respect to individual production performance in a heterogeneous reservoir. *JPSE,* 122, 551-566.). Such a category of work minimizes multiple history-matching errors (multi-objective minimizations). However, multiple history-matching errors have to trade-off with each other in the solution repository. The history-matching work cannot accept a solution that matches one set of historical data quite well but poorly on the other set of data. Therefore, the solution repository structured via the Pareto front solution contains a limited volume of suitable history-matching solutions. In addition, the Pareto front base optimization protocols need an intensive ranking procedure in every iteration step, which potentially increases the computational overhead of the algorithm (such as: Coello, C. A., Pulido, G. T., & Lechuga, M. S. (2004). Handling multiple objectives with particle swarm optimization. *EEE Tranactions on evolutionary computation,* 8(3), 256-279.).

From the literature survey on a current state of the art of the history matching study, there is no mature and practical methodology to address the non-uniqueness solution issue of the history matching problem.

SUMMARY OF THE DISCLOSURE

The embodiment of the present disclosure is directed to provide a method and equipment for searching a non-unique solution of a petrophysical property combination in history matching, which can effectively find the non-unique solution. Furthermore, more importantly, since each solution is obtained and validated by tuning and validating different combinations of data, the solution represents versatile physical understandings of an underground environment through a mathematical model.

In order to achieve the above objective, the embodiment of the present disclosure provides a method for searching a non-unique solution of a petrophysical property combination in history matching. The method includes: receiving field historical data, and dividing, according to a timeline, the field historical data into a tuning historical data portion for tuning the petrophysical property combination, and a validation historical data portion for validating the petrophysical property combination; inputting initial data for the petrophysical property combination into a machine-learning-based proxy model to obtain field response data; optimizing the petrophysical property combination based on the tuning historical data portion to minimize an error between the field response data corresponding to the optimized petrophysical property combination and the field response data of the tuning historical data portion; inputting the optimized petrophysical property combination into the machine-learning-based proxy model to obtain field response data corresponding to the optimized petrophysical property combination; matching the field response data corresponding to the optimized petrophysical property combination and the field response data of the validation historical data portion; and if the field response data corresponding to the optimized petrophysical property combination and the field response data of the validation historical data portion match each other, determining the optimized petrophysical property combination as the non-unique solution of the petrophysical property combination.

Through the above technical solution, one or more history matching solutions may be searched, so that the field historical data is used as an input to describe interested underground porous media. In addition, different petrophysical property distributions can be found through the above iteration process, and finally, a solution repository can be established to store a certain number of possible reservoir simulation models represented by different petrophysical property distributions. In addition, the present disclosure combines the advanced machine-learning-based proxy model with a heuristic optimization algorithm, so that the computation efficiency of the workflow can be improved.

Other features and advantages of the embodiments of the present disclosure will be described in detail in the following specific implementation modes.

BRIEF DESCRIPTION OF THE DRAWINGS

The accompanying drawings are used to provide a further understanding of the embodiments of the present disclosure, and constitute a part of the description. They are used to explain the embodiments of the present disclosure together with the following specific implementation modes, but do not constitute a limitation to the embodiments of the present disclosure. In the drawings.

DETAILED DESCRIPTION OF THE EMBODIMENTS

The specific implementation modes of the embodiments of the present disclosure are described in detail below with reference to the drawings. It should be understood that the specific implementation modes described herein are only used to illustrate and explain the embodiments of the present disclosure, and are not intended to limit the embodiments of the present disclosure.

It should be noted here that "a mathematical model", "a simulation model", and "a numerical simulation model" in this disclosure can be used interchangeably.

Figure 1:
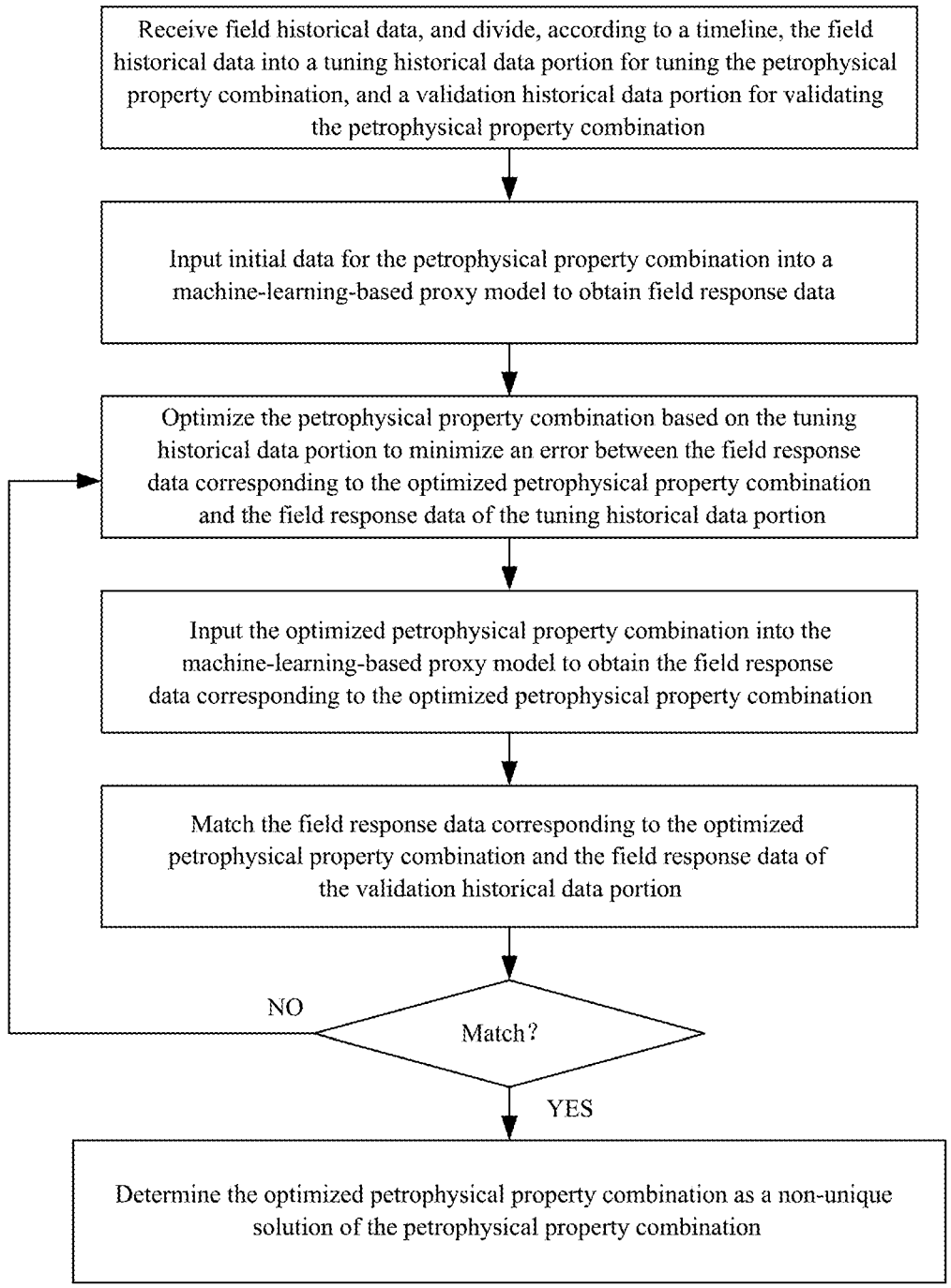
FIG. 1 is a flow diagram of a method for searching a non-unique solution of a petrophysical property combination in history matching provided by one embodiment of the present disclosure.

FIG. 1 is a flow diagram of a method for searching a non-unique solution of a petrophysical property combination in history matching provided by one embodiment of the present disclosure. As shown in FIG. 1, a method for searching a non-unique solution of a petrophysical property combination in history matching provided by the present disclosure includes that: field historical data is received, and is divided, according to a timeline, into a tuning historical data portion for tuning the petrophysical property combination, and a validation historical data portion for validating the petrophysical property combination; initial data (such as the permeability distribution, the multiphase flow characteristic, and the capillarity characteristic of a reservoir) for the petrophysical property combination is input into a machine-learning-based proxy model to obtain field response data (such as crude oil and natural gas production, and a pressure parameter); the petrophysical property combination is optimized based on the tuning historical data portion to minimize an error between the field response data corresponding to the optimized petrophysical property combination and the field response data of the tuning historical data portion; the optimized petrophysical property combination is input into the machine-learning-based proxy model to obtain field response data corresponding to the optimized petrophysical property combination; the field response data corresponding to the optimized petrophysical property combination is enabled to match the field response data of the validation historical data portion; and if the field response data corresponding to the optimized petrophysical property combination and the field response data of the validation historical data portion match each other, the optimized petrophysical property combination is determined as the non-unique solution of the petrophysical property combination. If the field response data corresponding to the optimized petrophysical property combination and the field response data of the validation historical data portion do not match each other, the petrophysical property combination is continued to be optimized, and the subsequent steps after the optimization operation are executed, so as to solve the non-unique solution.

The present disclosure may use one group of field historical data as an input to find out a plurality of versions of petrophysical property distributions. The field historical data may be divided into two portions based on a timeline of a project. The early portion (i.e., the tuning historical data portion) is configured to tune petrophysical properties. After an output (i.e., the field response data) of the machine-learning-based proxy model is consistent with the tuning data, the obtained petrophysical property combination would be used to obtain the corresponding field response data through the machine-learning-based proxy model, and the corresponding field response data is compared with the later portion (i.e., the validation historical data portion) of the oil field data. After the two portions match with each other, one possible description of the petrophysical properties may be found. The workflow of the present disclosure shows the advantage of effectively finding the non-unique solution. More importantly, since each solution is obtained and validated by tuning and validating different combinations of the data, the solution represents versatile physical understandings of an underground environment through a mathematical model.

Figure 2:
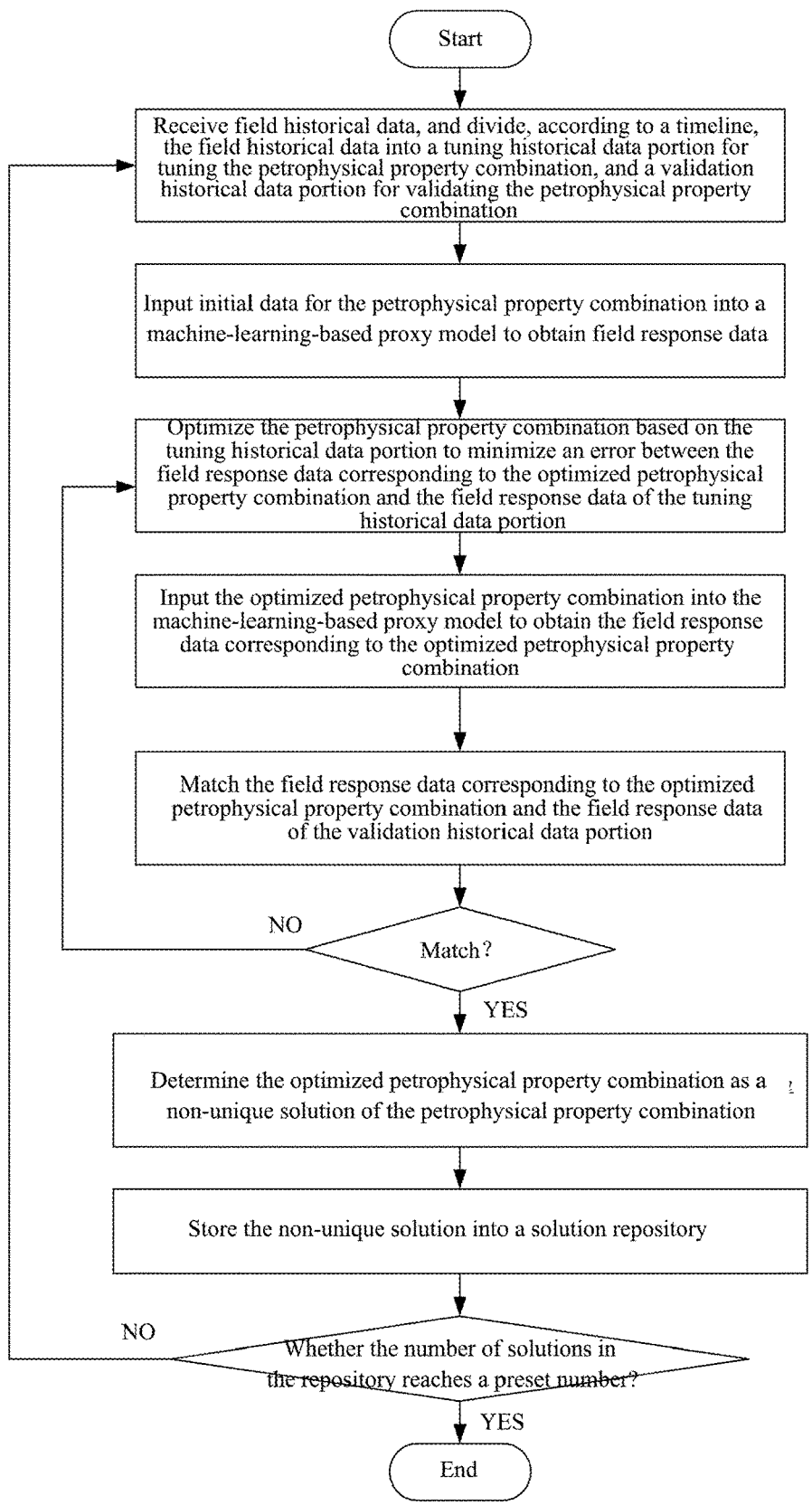
FIG. 2 is a flow diagram of a method for searching a non-unique solution of a petrophysical property combination in history matching provided by another embodiment of the present disclosure.

FIG. 2 is a flow diagram of a method for searching a non-unique solution of a petrophysical property combination in history matching provided by another embodiment of the present disclosure. A difference from the flow shown in FIG. 1 is that the flow of FIG. 2 includes that: after the non-unique solution of the petrophysical property combination is obtained, the non-unique solution is stored into a solution repository; then, whether the number of the non-unique solutions in the solution repository reaches a preset number is determined; if the number does not reach the preset number, the field historical data may be re-divided, and the above operations are re-executed according to the re-divided field historical data, so as to obtain another non-unique solution of the petrophysical property combination. Iteration is performed based on this standard until the number of the obtained non-unique solutions of the petrophysical property combination reaches the preset number. In the flow, a repository including a plurality of history matching solutions may be constructed, so as to represent an underground environment of a porous formation more accurately.

Figure 3:
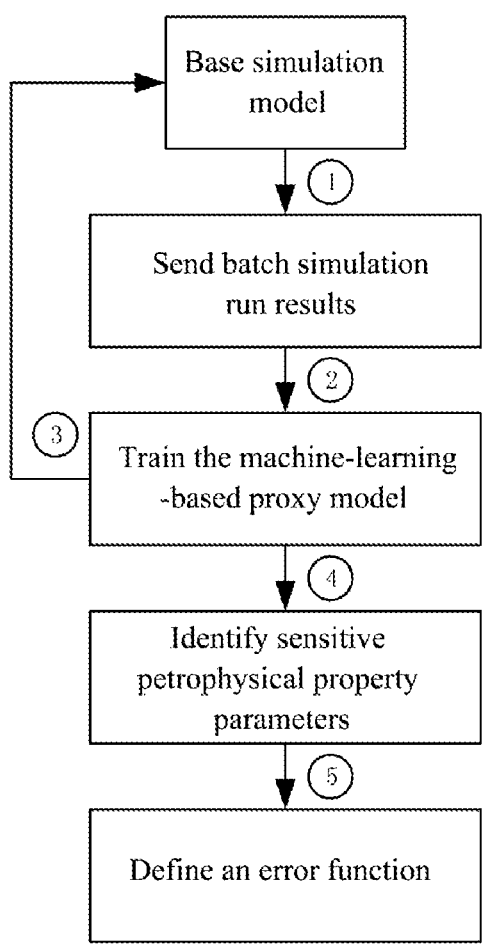
FIG. 3 is a flow diagram of a construction process of a proxy model of the present disclosure.

Specifically, the workflow of the present disclosure consists of two portions. FIG. 3 illustrates a first portion of the workflow, which is directed to train a machine-learning-based proxy model and define an error function of the history matching study. The serial numbers of the arrows indicate key steps explained below:

A certain number of random combinations of petrophysical property parameters are generated by using a design of experiment (DOE) protocol by varying the petrophysical property parameters with uncertainties; a batch run is performed on a numerical simulator by taking the random combinations as input data;

Results extracted from the batch runs are combined with the petrophysical property parameters to construct a knowledgebase, so as to train the machine-learning-based proxy model;

The machine-learning-based proxy model is validated by using blind testing data generated from the simulation model;

Sensitivity analysis is performed by using the proxy model, so as to determine the petrophysical property parameters with relatively high sensitivity; and A penalty (error) function to be minimized in the history matching study is defined based on the sensitive parameters and elements of history matching errors. In reservoir engineering applications, a history matching error function is usually defined as a sum of squares of the difference between a simulated value of the numerical model and the oil field data.

The first portion of the workflow of the present disclosure focuses on analyzing the field historical data and constructing a basic numerical reservoir simulation model. A high-fidelity hydrodynamic model is needed to depict the critical geological characteristics of a studied area. Notably, some of the petrophysical properties, such as geological structures, reservoir boundaries, the geometry of the faults and etc., should not be considered in the history-matching process. Extensive project Capex cost is spent to comprehend these petrophysical properties to reduce the uncertainties significantly. Typically, the history-matching process tunes the petrophysical properties related to the hydrodynamic characteristics of the system. For instance, the permeability distribution of the field, the multiphase flow characteristic, the capillarity characteristic, and etc., are the petrophysical properties tuned by the history matching work. The workflow of the disclosure would require a base case high-fidelity numerical reservoir simulation model to study the hydrodynamic mechanisms of fluid transportation in the porous media. Utilizing the base simulation model, one needs to send a certain number of batch runs by varying the petrophysical properties with uncertainties. At this stage, the broadly used sampling techniques (such as random sampling and Latin Hypercube Design) can be employed to design the numerical experiments and send batch simulation runs. The total number of simulation runs required to obtain a reasonable history matching result varies based on the complexity of the reservoir model. The outcomes of these numerical experiments establish a one-to-one relationship between the uncertain reservoir properties and field response generated by the numerical reservoir simulator. Notably, the simulated field responses have to be consistent with the available field historical data. Typically, such data include fluid production and the pressure data measured from the wells. By utilizing the dataset structured by the numerical experiments, a machine-learning-based proxy model can be developed to learn the data structure exhibited by the uncertain petrophysical properties against the field response data. The proxy model can be trained by using any supervised machine learning regression tools (such as neural network, response surfaces and support vector machines). Before deploying the proxy model to further use, it must be validated via a sufficient volume of blind testing applications. The blind testing applications are data generated by the numerical simulation model but never expose to the proxy model during the training stage. Once the proxy model is validated with a satisfactory testing error margin (less than 10% of relative error), it can be employed as an alternative model to generate simulated field response data but the computational speed is many orders of magnitude less than the high fidelity numerical model. The proxy model can be employed for the sensitivity analysis to identify the relatively important petrophysical properties for the tuning process. More importantly, the history matching error needs to be defined. This disclosure suggests using the error function as depicted by Equation (1):

$$E = \sum_{i}^{n} [(O_i - T_i)]^2 \quad (1)$$

wherein i is an index of the field response data based on the project timeline, O is the field response data from the proxy model, and T is the field historical data. For the history matching study, an error value of less than 10% may be considered as a satisfactory result.

The first portion of the workflow may generate a well-trained proxy model, a combination of petrophysical properties to be tuned in the iterative process, and an error function to be minimized.

Figure 4:
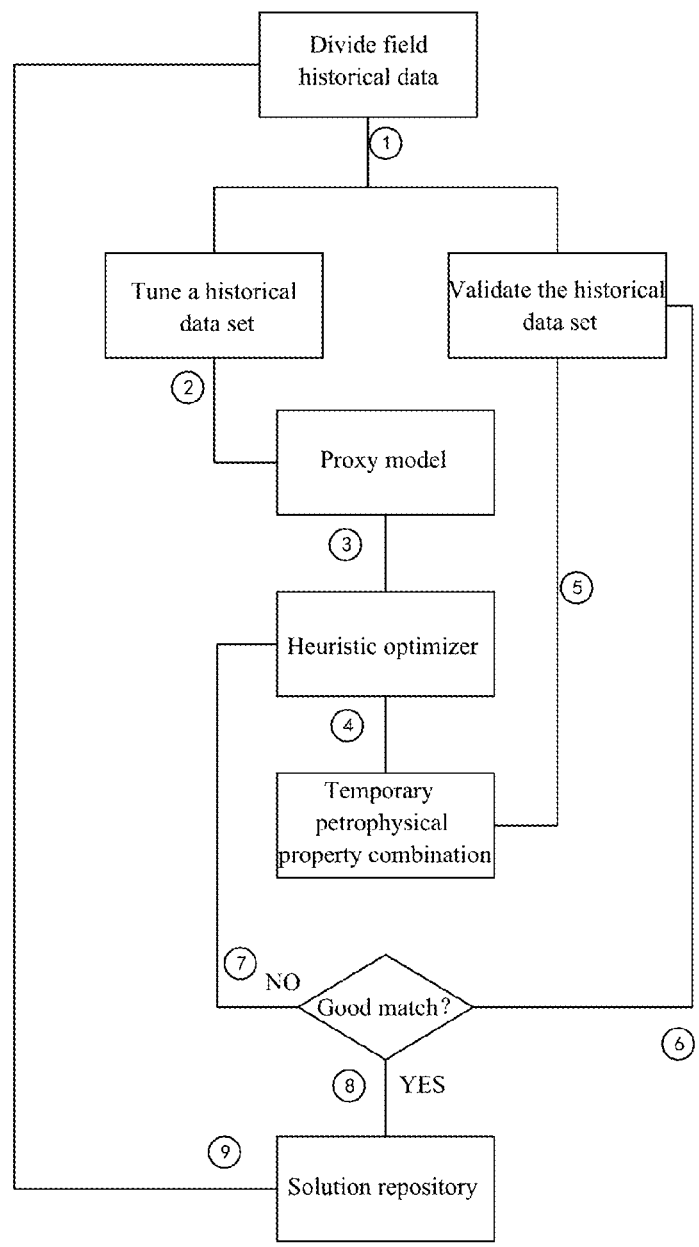
FIG. 4 is a flow diagram of an iteration process of establishing a history matching solution repository of the present disclosure.

The second portion of the workflow is an iteration process for constructing a history matching solution repository. FIG. 4 illustrates this iteration process. The critical procedure may be achieved through the following numbered steps:

The field historical data is divided into a tuning data set and a validation data set based on an original timeline to start the iteration.

An initial guess about the petrophysical properties is fed to the proxy model, and the error function is initialized. The input data of the proxy model is usually the petrophysical property parameters that need to be tuned, and the output data of the proxy model is the field response data (such as the crude oil and natural gas production, and the pressure data).

A heuristic optimizer is used to minimize the error function based on the tuning data. A heuristic optimization algorithm needs to define a range (a search interval) of the uncertain petrophysical property parameters, so as to output a petrophysical property parameter combination required to obtain a minimum error function.

A temporary optimal solution (i.e., the petrophysical property combination that generates the minimized error function) is output from Step 3.

The proxy model is used to predict the field response data based on the temporary optimal solution and the timeline of the validation data.

The predicted field response data is compared with the field response data in the validation data set to evaluate the error function of the validation as described in Step 5.

If the matching quality is unsatisfactory, the step 4 is re-executed, and the optimizer is re-initialized to find another temporary solution (i.e., a temporary petrophysical property parameter combination).

If the validation result is satisfactory, the solution is saved to the solution repository.

The iteration returns to Step 1 to re-divide the field historical data.

In the iteration process of the second portion of the present disclosure, the whole field historical data (the crude oil and natural gas production, the pressure data, etc.) may be divided into two portions based on the project timeline: the portion for tuning the petrophysical properties and the portion for validation. It may be assumed that the early portion of the field historical data is configured to tune the petrophysical properties, and the later portion is configured to perform validation. The iteration process may begin by initializing the petrophysical property distribution. The workflow uses a heuristic global optimization algorithm (e.g., particle swarm optimization and genetic algorithm) to minimize the history matching error that compares the model prediction with the tuning historical data. During the optimization, the proxy model trained in the first portion of the workflow will be called to evaluate the error function. The petrophysical property distribution that produces the minimum history matching error is saved as a temporary solution. Later, the temporary solution will be tested by predicting the field response along the timeline of the validation historical data. This process is essentially to validate the accuracy of the temporary solution by using the field data of the later portion. If satisfactory history matching quality is observed at the validation stage, the temporary solution will be stored in the solution repository. Otherwise, the workflow will repeat the optimization process by using the heuristic optimizer via changing the initialization and internal parameters. The above process may conclude one iteration loop of the workflow of the present disclosure. For the next iteration level, the workflow will undergo the same process by changing the tuning and validation processes. In this way, the history matching solution obtained from each iteration step will be a different solution because the data configured to perform tuning and validation of the reservoir model is different. The iteration process is terminated until the size of the repository reaches to a prescribed volume. Therefore, the workflow of the present disclosure is capable of finding a plurality of history matching solutions, so that the field historical data is used as an input to describe the interested underground porous media.

Compared with a current history matching technology, the workflow of the present disclosure shows the advantage of effectively finding the non-unique solution. More importantly, since each solution is obtained and validated by tuning and validating different combinations of the data, the solution represents versatile physical understandings of an underground environment through a mathematical model.

EMBODIMENT

Figure 5:
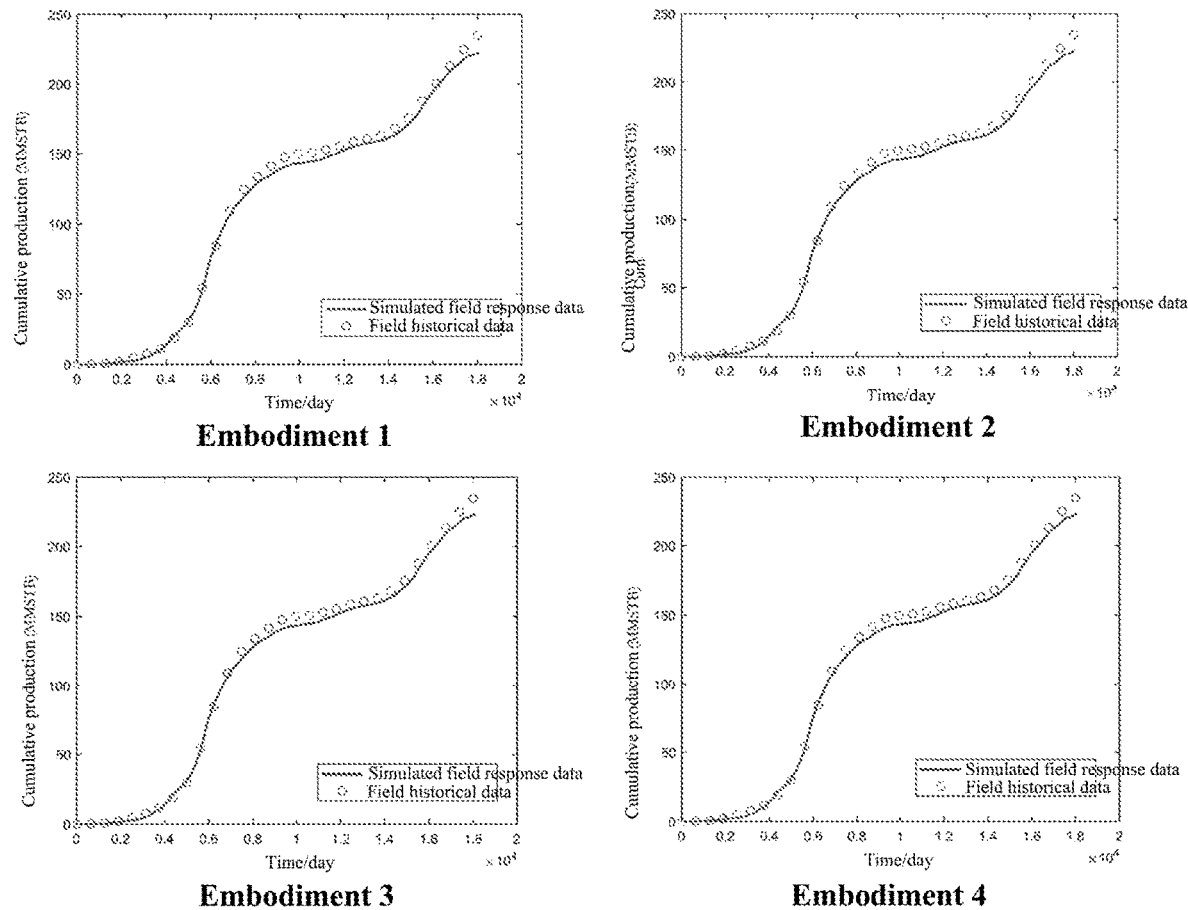
FIG. 5 illustrates a matching result between a cumulative petroleum production aspect and field historical data.
Figure 6:
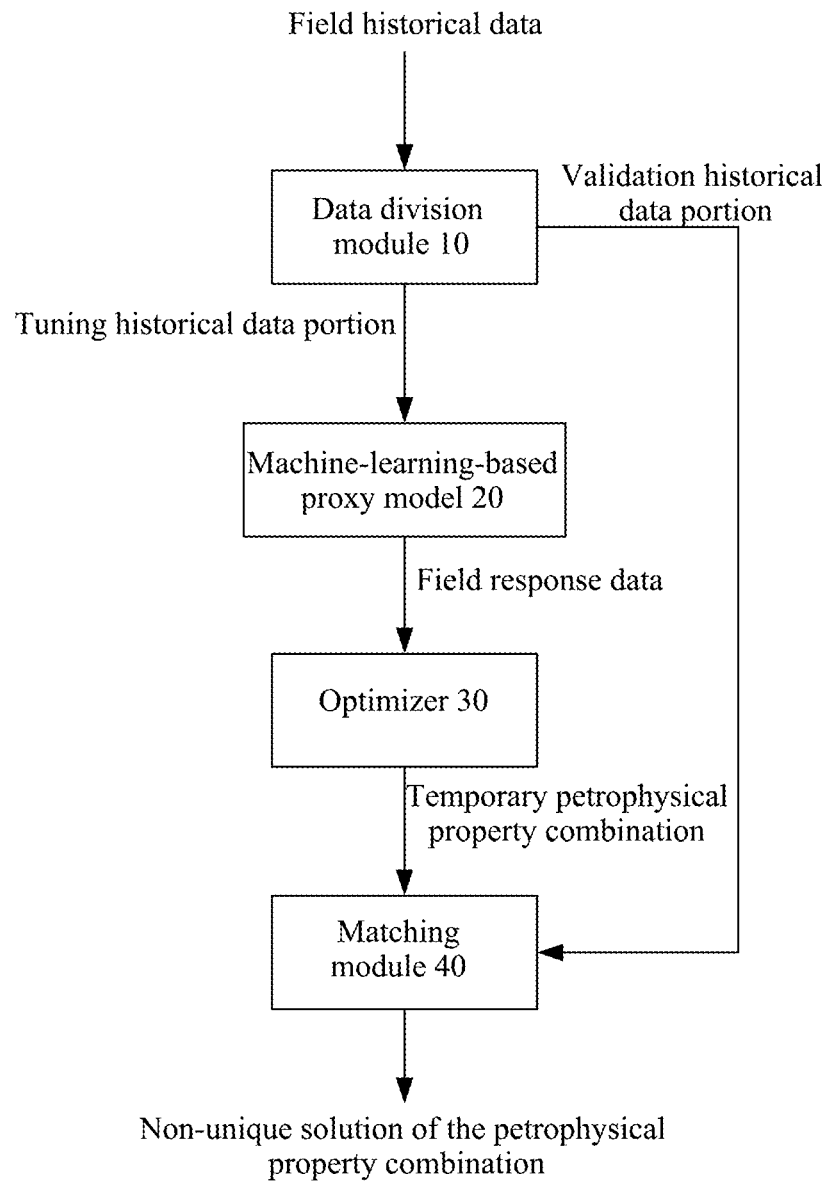
FIG. 6 is a block diagram of equipment for searching a non-unique solution of a petrophysical property combination in history matching provided by one embodiment of the present disclosure.

In order to validate the proposed history matching scheme, an embodiment study of field history matching is proposed. For more than 50 years of production data, the history matching study has turned 12 parameters to match the oil production history. By using the proposed method, four different history matching solutions may be found by using various combinations of the petrophysical parameters. In Table 1, the portions of the historical data for tuning and validation are summarized. In addition, Table 2 lists the different history matching solutions found by the proposed technology. Moreover, FIG. 5 illustrates the matching results with the field historical data in terms of cumulative oil production.

TABLE 1

Data portion for testing the provided history matching technology

|  | Tuning | Validation |
|---|---|---|
| Embodiment 1 | 50% | 50% |
| Embodiment 2 | 58% | 42% |
| Embodiment 3 | 66% | 34% |
| Embodiment 4 | 75% | 25% |

TABLE 2

Non-unique history matching solutions found by the workflow of the disclosure

| Embodiment | Parameter | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Embodiment 1 | 47.782 | 0.258 | 0.000 | 5.082 | 6.997 | 6.128 | 0.352 | 0.504 | 0.998 | 0.087 | 5.133 | 0.105 |
| Embodiment 2 | 85.168 | 0.211 | 0.024 | 4.909 | 6.997 | 6.918 | 0.697 | 0.577 | 0.802 | 0.052 | 3.683 | 0.105 |
| Embodiment 3 | 51.285 | 0.279 | 0.000 | 4.248 | 6.997 | 6.155 | 0.212 | 0.504 | 0.998 | 0.068 | 5.029 | 0.106 |
| Embodiment 4 | 25.683 | 0.248 | 0.001 | 3.830 | 4.342 | 1.091 | 0.203 | 0.633 | 0.898 | 0.099 | 5.437 | 0.106 |

The above history matching generates satisfactory results with error margins of less than 10%. As shown in FIG. 5, the simulated data is well consistent with the field historical data. However, if more combinations about the tuning/validation data may be implemented, more non-unique solutions may be obtained. More importantly, the four history matching embodiments found by the technology of the present disclosure show various parameter combinations. For example, parameter 1 ranges from 25.7 to 85.2, and parameter 11 ranges from 3.7 to 5.4. However, some other parameters do not exhibit strong non-uniqueness. For example, the parameter 12 is 0.105 or 0.106 for all the embodiments. This result from the present embodiment confirms the effectiveness of the history matching method of the present disclosure. It is also worth emphasizing that if more uncertainty parameters are involved in the history matching process, the technology may find more non-unique solutions. Therefore, the method of the present disclosure may be considered as a very robust history matching workflow for solving numerical modeling problems of various types of oil and gas fields.

Correspondingly, one embodiment of the present disclosure further provides equipment for searching a non-unique solution of a petrophysical property combination in history matching. The equipment includes a data division module, configured to receive field historical data, and divide, according to a timeline, the field historical data into a tuning historical data portion for tuning the petrophysical property combination, and a validation historical data portion for validating the petrophysical property combination; a machine-learning-based proxy model, configured to receive an initial data input for the petrophysical property combination, and output field response data; an optimizer, configured to optimize the petrophysical property combination based on the tuning historical data portion to minimize an error between the field response data corresponding to the optimized petrophysical property combination and the field response data of the tuning historical data portion; and a matching module, configured to input the optimized petrophysical property combination into the machine-learning-based proxy model to obtain field response data corresponding to the optimized petrophysical property combination, and match the field response data corresponding to the optimized petrophysical property combination and the field response data of the validation historical data portion. If the field response data corresponding to the optimized petrophysical property combination and the field response data of the validation historical data portion match each other, the optimized petrophysical property combination is determined as the non-unique solution of the petrophysical property combination. Specific descriptions and benefits of the equipment may refer to the descriptions of the method for searching the non-unique solution of the petrophysical property combination in history matching, and details thereof are not repeated here.

According to another aspect, the present disclosure provides a machine-readable storage medium. The machine-readable storage medium stores an instruction configured to enable a machine to execute the above method of the present disclosure.

The above contents are only the embodiments of the present disclosure, but not intended to limit the present disclosure. Those skilled in the art can make various changes and modifications to the present disclosure. Any modifications, equivalent replacements, improvements and the like that are made without departing from the spirit and the principle of the present disclosure shall all fall within the scope of claims of the present disclosure.

The invention claimed is:

1. A method for searching a non-unique solution of a petrophysical property combination in history matching, comprising:
   receiving field historical data, and dividing, according to a timeline, the field historical data into a tuning historical data portion for tuning the petrophysical property combination, and a validation historical data portion for validating the petrophysical property combination;
   inputting initial data for the petrophysical property combination into a machine-learning-based proxy model to obtain field response data;
   optimizing the petrophysical property combination based on the tuning historical data portion to minimize an error between the field response data corresponding to the optimized petrophysical property combination and the field response data of the tuning historical data portion;
   inputting the optimized petrophysical property combination into the machine-learning-based proxy model to obtain field response data corresponding to the optimized petrophysical property combination;
   matching the field response data corresponding to the optimized petrophysical property combination and the field response data of the validation historical data portion; and
   if the field response data corresponding to the optimized petrophysical property combination and the field response data of the validation historical data portion match each other, determining the optimized petrophysical property combination as the non-unique solution of the petrophysical property combination.

2. The method according to claim 1, wherein the optimization operation is performed through a heuristic optimizer, and the heuristic optimizer defines a search interval of uncertain petrophysical property parameters.

3. The method according to claim 1, wherein the machine-learning-based proxy model is obtained by training the machine-learning-based proxy model using the field historical data through a machine-learning-based algorithm.

4. The method according to claim 1, wherein the computational speed of the machine-learning-based proxy model is many orders of magnitudes less than a high-fidelity numerical simulation model.

5. The method according to claim 1, wherein if the field response data corresponding to the optimized petrophysical property combination and the field response data of the validation historical data portion do not match each other, the petrophysical property combination is continued to be optimized.

6. The method according to claim 1, wherein after the non-unique solution of the petrophysical property combination is obtained, the field historical data is re-divided, and the above operations is re-executed according to the re-divided field historical data, so as to obtain another non-unique solution of the petrophysical property combination.

7. The method according to claim 6, wherein the above operations are iteratively performed until the number of non-unique solutions of the petrophysical property combination reaches a preset number.

8. Equipment for searching a non-unique solution of a petrophysical property combination in history matching, comprising:
   a data division module, configured to receive field historical data, and divide, according to a timeline, the field historical data into a tuning historical data portion for tuning the petrophysical property combination, and a validation historical data portion for validating the petrophysical property combination;
   a machine-learning-based proxy model, configured to receive an initial data input for the petrophysical property combination, and output field response data;
   an optimizer, configured to optimize the petrophysical property combination based on the tuning historical data portion to minimize an error between the field response data corresponding to the optimized petrophysical property combination and the field response data of the tuning historical data portion; and
   a matching module, configured to input the optimized petrophysical property combination into the machine-learning-based proxy model to obtain field response data corresponding to the optimized petrophysical property combination, and match the field response data corresponding to the optimized petrophysical property combination and the field response data of the validation historical data portion, wherein if the field response data corresponding to the optimized petrophysical property combination and the field response data of the validation historical data portion match each other, the optimized petrophysical property combination is determined as the non-unique solution of the petrophysical property combination.

9. The equipment according to claim 8, wherein the optimizer is a heuristic optimizer, and defines a search interval of uncertain petrophysical property parameters.

10. The equipment according to claim 8, wherein the machine-learning-based proxy model is obtained by training the machine-learning-based proxy model using the field historical data through a machine-learning-based algorithm.

11. The equipment according to claim 8, wherein the computational speed of the machine-learning-based proxy model is many orders of magnitudes less than a high-fidelity numerical simulation model.

12. The equipment according to claim 8, wherein if the field response data corresponding to the optimized petrophysical property combination and the field response data of the validation historical data portion do not match each other, the optimizer continues to optimize the petrophysical property combination.

13. The equipment according to claim 8, wherein after the non-unique solution of the petrophysical property combination is obtained, the data division module re-divides the field historical data, and the machine-learning-based proxy model, the optimizer and the matching module re-execute the above operations according to the re-divided field historical data, so as to obtain another non-unique solution of the petrophysical property combination.

14. The equipment according to claim 13, wherein the data division module, the machine-learning-based proxy model, the optimizer and the matching module iteratively perform the above operations until the number of non-unique solutions of the petrophysical property combination reaches a preset number.

* * * * *